(12) United States Patent
Liu et al.

(10) Patent No.: US 6,362,464 B1
(45) Date of Patent: Mar. 26, 2002

(54) SYSTEM FOR STELLAR INERTIAL ATTITUDE DETERMINATION

(75) Inventors: Yong Liu, San Marino; Yeong-Wei A. Wu, Rancho Palos Verdes; Rongsheng Li, Hacienda Heights; Christopher L. Rice, Lawndale, all of CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/504,543

(22) Filed: Feb. 15, 2000

(51) Int. Cl.[7] ............................................... G01C 21/02
(52) U.S. Cl. ............................... 250/206.1; 250/203.6; 244/171
(58) Field of Search ........................... 250/206.1, 203.6, 250/203.1; 356/139.01, 139.03; 244/171, 164, 158 R, 159

(56) References Cited

U.S. PATENT DOCUMENTS 3,614,239 A * 10/1971 Kissell ..................... 250/203.1

* cited by examiner

*Primary Examiner*—Que T. Le
(74) *Attorney, Agent, or Firm*—Terje Gudmestad

(57) ABSTRACT

An apparatus for determining stellar inertial attitude based upon a plurality of stars includes a star tracker and a controller. The star tracker is used to sense the positions of stars and generate signals corresponding to the positions of the stars as seen in its field of view. The controller checks a star catalog and actively determines which stars to track. The controller does this determination in terms of each star's relative geometry. The controller then commands the star tracker to track these stars and uses them to determine the spacecraft attitude.

21 Claims, 1 Drawing Sheet

SYSTEM FOR STELLAR INERTIAL ATTITUDE DETERMINATION

STATEMENT OF GOVERNMENT INTEREST

Portions of the invention set forth herein were developed with Government support. As a result, the United States of America as represented by its various departments and agencies may have certain rights in this patent.

TECHNICAL FIELD

The present invention relates generally to star trackers, and more particularly, to a system for stellar inertial attitude determination.

BACKGROUND ART

Satellites and other spacecraft are in widespread use for various purposes including scientific research and communications. Many scientific and communications missions, however, cannot be accurately fulfilled without consistently monitoring and controlling the 3-axis attitude of the spacecraft. In many applications, the satellite must be positioned to direct communication signals in particular directions or to receive signals from specifically located sources. Without accurate control over spacecraft 3-axis attitude, the transmission of such signals is hindered and at times impossible.

Many modern spacecraft use star trackers for 3-axis attitude control. The systems for 3-axis attitude determination generally include one or more star trackers and a separate 3-axis orthogonal gyroscope. During normal operation, star trackers provide continuous attitude information and the 3-axis orthogonal gyroscope is needed to provide rate information and is constantly corrected by the star trackers.

Star trackers are capable of providing 3-axis attitude information by using a star pattern seen in the field of view (FOV) of the star tracker. Unfortunately, the star pattern selected by these star trackers is not always the most optimal star pattern available. In fact, the current art of star selection within the real time tracker FOV is somewhat arbitrary with regard to improving overall system accuracy (e.g., it is commonly suggested that the first few brightest stars be selected).

To improve spacecraft attitude control performance, stellar inertial attitude determination algorithms employ a carefully designed star catalog. The current known art in star selection for star trackers mainly concentrates on generating star catalogs with certain properties. Typically, a star catalog is "equalized" by eliminating stars in the dense areas of the star catalog. The resulting star catalog becomes approximately uniformly distributed and is known to improve stellar inertial attitude determination performance. However, star catalog equalization only assures equal distribution in an average sense and may fail to guarantee desirable star patterns in real time for a moving tracker field of view (FOV). Moreover, a fixed star catalog does not allow the tracker to actively and dynamically select star patterns in order to optimize the stellar inertial attitude determination performance. In addition, the star catalog must be reloaded once the spacecraft condition and star tracker condition are changed.

Therefore, there exists a need to improve stellar inertial attitude determination performance by actively and dynamically selecting star patterns from stars visible to the star tracker in real time on-board the spacecraft.

SUMMARY OF THE INVENTION

It is, therefore, an object of the invention to provide an improved and reliable system for stellar inertial attitude determination. Another object of the invention is to provide a system capable of actively and dynamically selecting star patterns.

In one embodiment of the invention, an apparatus for determining stellar inertial attitude based upon a plurality of stars includes a star tracker and a controller. The star tracker is used to sense the positions of stars and generate signals corresponding to the positions of the stars as seen in its field of view. The controller checks a star catalog and actively determines which stars to track. The controller does this determination in terms of each star's relative geometry. The controller then commands the star tracker to track these stars and uses them to determine the spacecraft attitude.

The present invention thus achieves an improved system for stellar inertial attitude determination. The present invention is advantageous in that many types of measurement noises for multi-star tracker systems can be minimized.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
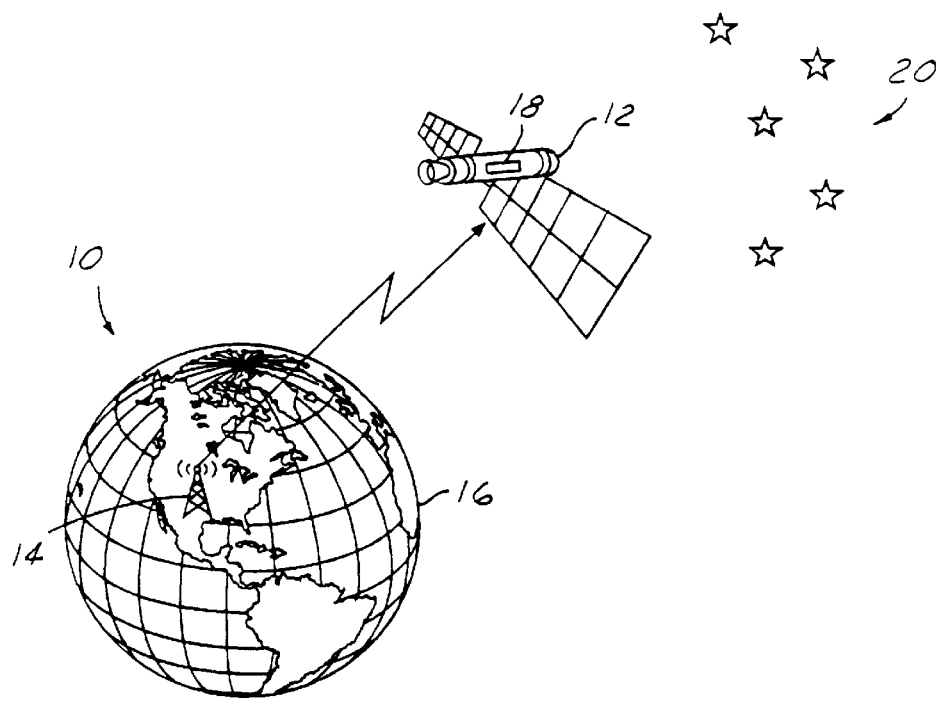
FIG. 1 is a perspective view of a satellite stellar inertial attitude determination system in accordance with the preferred embodiment of the present invention.

Referring to FIG. 1, a perspective view of a satellite stellar inertial attitude determination system 10 in accordance with one embodiment of the present invention is illustrated. The satellite system 10 is comprised of one or more satellites 12 in communication with a ground station 14 located on the Earth 16. Each satellite includes an apparatus 18 for determining stellar inertial attitude based upon a plurality of stars 20.

The satellite stellar inertial attitude determination system 10 is responsible for consistently monitoring the attitude of satellite 12. Many scientific and communications missions cannot be accurately fulfilled without consistently monitoring and controlling the spacecraft 3-axis attitude. In many applications the satellite must be positioned to direct communication signals in particular directions or to receive signals from specifically located sources.

Figure 2:
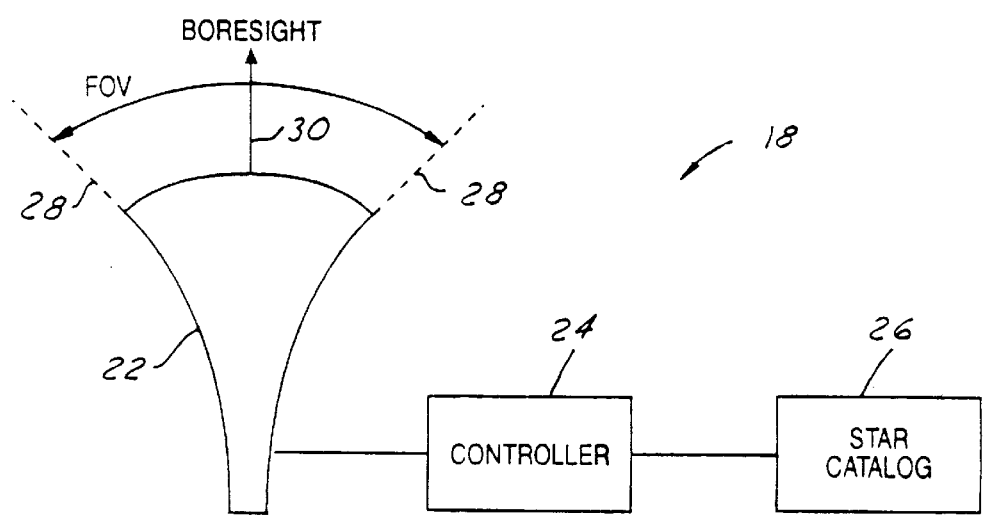
FIG. 2 is a block diagram of an apparatus for determining stellar inertial attitude based upon a plurality of stars in accordance with the preferred embodiment of the present invention.

Without accurate control over spacecraft 3-axis attitude, the transmission of such signals is hindered and at times impossible Referring to FIG. 2, a block diagram of an apparatus 18 for determining stellar inertial attitude based upon a plurality of stars 20 in accordance with one embodiment of the present invention is illustrated.

Apparatus 18 includes a star tracker 22 and a controller 24. Apparatus 18 also includes a star catalog 26.

Star tracker 22 is mounted to satellite 12 and is coupled to star tracker controller 24. Star tracker 22 includes a field of view (FOV) 28 and a boresight 30 centered in the FOV 28. Star tracker 22 is used to sense a plurality of positions of a plurality of stars 20 relative to star tracker 22. Star tracker 22 then generates a plurality of signals corresponding to the plurality of star positions in the FOV 28.

Star tracker controller 24 may reside either in satellite 12 or with ground station 14. Controller 24 is coupled to star tracker 22 and receives the plurality of signals corresponding to the plurality of star positions in the FOV 28. Star tracker controller 24 provides control logic operative to select at least two of the plurality of signals corresponding to the positions of at least two stars. Controller 24 selects these signals to maximize the distance between these stars in the FOV 28. The controller then determines the attitude of satellite 12 using the stars selected together with star catalog 26. Controller 24 is preferably microprocessor based.

Star catalog 26 consists of a plurality of star right ascension and declination angles in a given earth centered inertial (ECI) frame, star instrument magnitude, and other star properties. A star's measurement from star tracker is given in terms of the two look angles within the FOV 28, normally defined in a right-handed Cartesian frame. The unit vector of a star's line-of-sight (LOS) is defined as:

$$\vec{s} = s_x \vec{x} + s_y \vec{y} + s_z \vec{z} \quad (1)$$

where $\vec{x}, \vec{y}, \vec{z}$ forms FOV 28 Cartesian frame with $\vec{z}$ along boresight 30. For two stars in FOV 28, the (angular) distance between the two stars is defined as the separation angle between the LOS vectors of the two stars, defined as:

$$\text{dist}(\vec{s}_1, \vec{s}_2) = \arccos(<\vec{s}_1, \vec{s}_2>) \quad (2)$$

where $(\vec{s}_1, \vec{s}_2)$ denotes the inner product of $\vec{s}_1$ and $\vec{s}_2$. One skilled in the art would realize that the present invention also applies to other distance metric definitions as well.

One criteria used in the present invention is to maximize the angular distance among the selected stars. At any given time, N stars can be tracked simultaneously by star tracker 22 and M stars are visible in the current FOV 28. As FOV 28 moves through the celestial region, new stars come into view while old stars drop out. For instance, for a geostationary spacecraft, the stars appear to move in/out of FOV 28 at a rate of fifteen degrees per hour.

Depending on the sensitivity of star tracker 22 and celestial region in FOV 28, there is a possibility that M>N. This redundancy allows controller 24 to select certain stars to improve satellite stellar inertial attitude determination system 10 performance. The direction cosine matrix (DCM) $C_{ST\_ECI}$ of star tracker 22 fixed coordinate system ST relative to the earth centered inertial coordinate system ECI can be used to determine if a star in ECI frame is within FOV 28. A star is within FOV 28 if:

$$\text{dist}(C_{ST\_ECI}S^{ECI}, B^{ST}) \leq \arccos(\theta_{FOV}) \quad (3)$$

where $B^{ST}$ is boresight 30 unit vector in FOV 28, $S^{ECI}$ is the star LOS unit vector in the ECI frame, and $\theta_{FOV}$ is FOV 28 radius for a circular FOV. One skilled in the art would realize that the present invention also applies to other shaped FOVs, such as rectangular or square.

For a given star tracker 22, if an estimate of star tracker 22 or satellite 12 attitude is known, as is the case for most controlled spacecraft, then a subset of all stars within FOV 28 can be predicted. This star catalog 26 subset may be denoted as Θ. Stars may then be selected if the number of stars in FOV 28 M is greater then the number of tracked stars N. A new star is picked if:

$$\sum_{i=1}^{N} \text{dist}(S_{NEW}^{ECO}, C_{ECI\_ST}S_i^{ST}) = \max\left(\sum_{i=1}^{N}(S_j^{ECI}, C_{ECI\_ST}S_i^{ST}), j = 1, 2, \ldots, (M-N)\right) \quad (4)$$

where j is the index of the stars visible within FOV 28 but not yet tracked. Equation (4) may be modified to accommodate other considerations in star selections. For instance, a star magnitude threshold can be used to filter out stars dimmer than a certain magnitude. Normally, if the maximum number of stars allowed by the capability of star tracker 22 are already tracked, a new star will start to be tracked only when one or more tracked stars move out of FOV 28 or a command is received to break-track one or more tracked stars.

This "passive" star selection management may be replaced by more aggressive schemes. For example, while maximizing distance between tracked stars improves overall system performance, analysis has shown that having the tracked stars "center of mass" (the average location of all stars tracked) relatively close to boresight 30 will reduce star tracker 22 low spatial frequency errors. Centering the average location also reduces the dynamic error induced by misalignment and tracker switching in multi-tracker based SIAD systems. If this is the design goal for the star selection scheme, then a threshold can be used to constantly check the "star spread", defined, for instance, by:

$$L_{SPREAD} = \Sigma \text{dist}(S_i^{ST}, S_j^{ST}) \quad (5)$$

where the summation is performed for all possible pairs of tracked stars. 2 0 Another threshold may be used to constantly check the "star mass center bias", defined, for example, as follows. For two star measurement unit vectors $\vec{s}_1$ and $\vec{s}_2$, define the average unit vector s that satisfies:

$$<\vec{s}_1, \vec{s}> = c$$
$$<\vec{s}_2, \vec{s}> = c$$
$$<\vec{s}, \vec{s}> = 1$$

where $$c = \cos\left(\frac{\arccos(\langle \vec{s}_1, \vec{s}_2 \rangle)}{2}\right)$$

Equation (6) can be solved for the solution of such an "average" unit vector $\vec{s}$ = average($\vec{s}_1, \vec{s}_2$). The average of N unit vectors follows as:

$$\vec{s} = \text{average}(\vec{s}_1, \vec{s}_2, \ldots, \vec{s}_N) \quad (7)$$

Finally, the "center of mass" bias measure is defined as:

$$L_{CM.BIAS} = <B^{ST}, \vec{s}_{AVERAGE}> \quad (8)$$

where $B^{ST}$ is boresight 30 unit vector in FOV 28. With the definitions of the two star geometry measures, break-track command can be issued if:

$$L_{CM.BIAS} > L_{CM.BIAS\_LIMIT}$$

The result is that non-tracked stars that have better geometry can actively replace the tracked stars even when no tracked star is dropping out of FOV 28.

In another embodiment of the present invention, if real-time star selection can not be easily implemented due to a hardware limitation or real-time software complexity, then the same principles can be implemented at the star catalog level to achieve similar results.

From the foregoing, it can be seen that there has been brought to the art a new and improved system for stellar inertial attitude determination. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An apparatus for determining stellar inertial attitude based upon a first plurality of stars, said apparatus comprising:
    a star tracker for sensing a plurality of positions of a second plurality of stars relative to said star tracker, said star tracker having a field of view and generating a plurality of signals corresponding to said plurality of positions in said field of view; and
    a controller coupled to said star tracker and receiving said plurality of signals, said controller having control logic operative to determine a maximum first distance between said plurality of positions, select at least two of said plurality of signals corresponding to the positions of at least two of said second plurality of stars having said maximum first distance between said at least two stars, and determine an attitude corresponding to the positions of said at least two stars.

2. The apparatus for determining stellar inertial attitude based upon a first plurality of stars as recited in claim 1, wherein said first distance comprises a separation angle between at least two line of sight vectors of said at least two stars.

3. The apparatus for determining stellar inertial attitude based upon a first plurality of stars as recited in claim 1, wherein said controller includes control logic operative to select a third star, said third star being one of said second plurality of stars, said control logic determining a maximum second distance based on the position of said third star.

4. The apparatus for determining stellar inertial attitude based upon a first plurality of stars as recited in claim 3, wherein, said control logic determination is based upon the equation:

$$\sum_{i=1}^{N} dist(S_{NEW}^{ECI}, C_{ECI\_ST}S_i^{ST}) = \max\left(\sum_{i=1}^{N}(S_j^{ECI}, C_{ECI\_ST}S_i^{ST}), j = 1, 2, \ldots, (M-N)\right).$$

5. The apparatus for determining stellar inertial attitude based upon a first plurality of stars as recited in claim 3, wherein said control logic filters out dimmer stars based upon a star magnitude threshold.

6. The apparatus for determining stellar inertial attitude based upon a first plurality of stars as recited in claim 1, wherein said field of view includes a boresight centered in said field of view.

7. The apparatus for determining stellar inertial attitude based upon a first plurality of stars as recited in claim 6, wherein said controller includes control logic operative to select at least two stars such that the average of the position of said at least two stars is substantially in line with said boresight.

8. The apparatus for determining stellar inertial attitude based upon a first plurality of stars as recited in claim 1, further comprising a star catalog coupled to said controller.

9. A satellite stellar inertial attitude determination system comprising:
    a ground station;
    a satellite in orbit and in communication with said ground station, said satellite having an apparatus for determining stellar inertial attitude based upon a first plurality of stars comprising:
        a star tracker for sensing a plurality of positions of a second plurality of stars relative to said star tracker, said star tracker having a field of view and generating a plurality of signals corresponding to said second plurality of star positions in said field of view; and
        a controller coupled to said star tracker and receiving said plurality of signals, said controller having control logic operative to determine a maximum first distance between said star positions, select at least two of said plurality of signals corresponding to the positions of at least two of said second plurality of stars having said maximum first distance between said at least two stars, and determine an attitude corresponding to the positions of said at least two stars.

10. The satellite stellar inertial attitude determination system as recited in claim 9, wherein said controller is located in said satellite.

11. The satellite stellar inertial attitude determination system as recited in claim 9, wherein said controller is located in said ground station.

12. The satellite stellar inertial attitude determination system as recited in claim 9, wherein said first distance comprises a separation angle between at least two line of sight vectors of said at least two stars.

13. The satellite stellar inertial attitude determination system as recited in claim 9, wherein said controller includes control logic operative to select a third star, said third star being one of said second plurality of stars, said control logic determining a maximum second distance based on the position of said third star.

14. The satellite stellar inertial attitude determination system as recited in claim 13, wherein, said control logic determination is based upon the equation:

$$\sum_{i=1}^{N} dist(S_{NEW}^{ECI}, C_{ECI\_ST}S_i^{ST}) = \max\left(\sum_{i=1}^{N}(S_j^{ECI}, C_{ECI\_ST}S_i^{ST}), j = 1, 2, \ldots, (M-N)\right).$$

15. The satellite stellar inertial attitude determination system as recited in claim 13, wherein said control logic operative to filters out dimmer stars based upon a star magnitude threshold.

16. The satellite stellar inertial attitude determination system as recited in claim 9, wherein said field of view includes a boresight centered in said field of view.

17. The satellite stellar inertial attitude determination system as recited in claim 16, wherein said controller includes control logic operative to select at least two stars such that the average of the position of said at least two stars is substantially in line with said boresight.

18. The satellite stellar inertial attitude determination system as recited in claim 9, further comprising a star catalog coupled to said controller.

19. A method of stellar inertial attitude determination based upon a first plurality of stars comprising the steps of:

sensing a plurality of positions of a second plurality of stars relative to a star tracker;

generating a plurality of signals corresponding to said plurality of positions;

receiving said plurality of signals;

determining a maximum first distance between said plurality of positions;

selecting at least two of said plurality of signals corresponding to the positions of at least two of said second plurality of stars having a maximum first distance between said at least two stars;

determining an attitude corresponding to the positions of said at least two stars.

20. The method of stellar inertial attitude determination based upon a first plurality of stars as recited in claim 19, further comprising the step of selecting a third star based upon a maximum second distance of said third star.

21. The method of stellar inertial attitude determination based upon a first plurality of stars as recited in claim 19, further comprising the step of selecting at least two stars such that the average of the position of said at least two stars is substantially centered in said field of view.

* * * * *